Feb. 20, 1968   B. F. COHLAN   3,369,770

DRAG FREE SPACECRAFT

Filed May 20, 1965

INVENTOR.
BERNARD F. COHLAN
BY
Elliott & Pastoriza
ATTORNEYS

United States Patent Office 3,369,770
Patented Feb. 20, 1968

3,369,770
DRAG FREE SPACECRAFT
Bernard F. Cohlan, 2850 Moraga Drive,
Los Angeles, Calif. 90024
Filed May 20, 1965, Ser. No. 457,344
3 Claims. (Cl. 244—1)

ABSTRACT OF THE DISCLOSURE

This disclosure relates to a drag free spacecraft made up of inner and outer bodies. The outer body includes an inner module surrounding the inner body and free of any physical engagement with the inner body, an intermediate module connected to and surrounding the inner module, and an outer module incorporating instruments connected to and surrounding the intermediate module. The inner body constitutes a free mass and the inner module surrounding the inner body incorporates sensing means for detecting the position of the mass. The intermediate module includes propulsion means extending to the exterior of the outer module. These propulsion means are responsive to the sensing means to move the entire outer body comprised of the inner, intermediate, and outer modules as a unit in a direction to maintain the inner body or mass substantially centered within the inner module while the inner body is in free orbit with respect to an external celestial body. Drag forces experienced by the outer body are therefore compensated and the spacecraft travels as a whole substantially in an orbit as though gravity were the only force acting on the craft. The intermediate and outer modules are interchangeable with different intermediate and the outer modules for use with the same inner body and inner module so that the same inner mass and sensing system may be utilized with different intermediate and outer modules in conducting a series of experiments.

---

Figure 1:
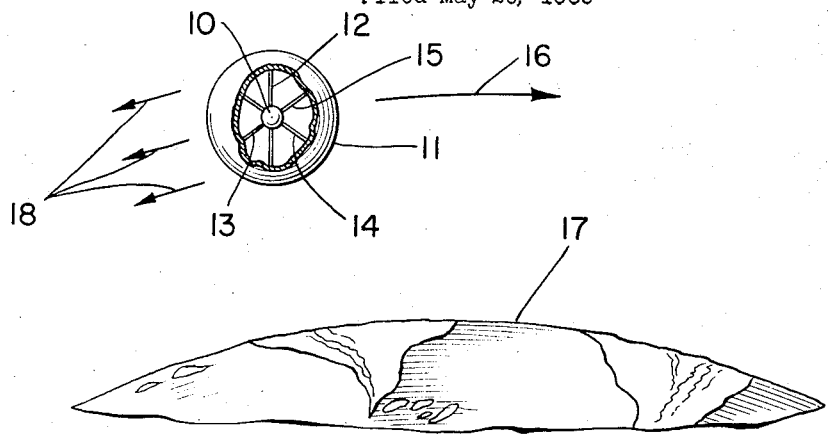

This invention relates generally to spacecrafts and more particularly to an improved spacecraft primarily useful as an artificial earth satellite.

The "life" of present day artificial satellites depends in large measure on the perigee distance of the established orbit. For orbits having a perigee greater than 600 kilometers from the earth, the drag resistances from the upper atmosphere and space particles in the near vicinity of the earth's gravitational field are minimal and the life of the satellite is relatively long. As a consequence, many experiments may be carried out with such satellites without concern as to deleterious effects on the orbital path due to such drag effects.

However, there are many instances in which it is desired to conduct experiments by means of satellites relatively close to the earth. For example, to obtain accurate information relating to the upper atmosphere, geophysical characteristics, and the like, an orbiting satellite within the near region of from 100–600 kilometers is most desirable. Further, close in satellites are preferable for certain communication and navigational purposes. Since the drag characteristics of the atmosphere are considerably greater in this range, the "life" of such satellites as have been provided heretofore is relatively short and certainly not of a duration to enable experiments of the accuracy desired to be carried out. In addition, the drag forces divert the satellite from the true orbit that would result were the satellite under the influence of gravity alone. As a consequence, measurements of the satellite's orbit, particularly with respect to obtaining data relating to the mass distribution in the earth, for example, are not reliable.

With the foregoing considerations in mind, it is accordingly a primary object in this invention to provide a novel spacecraft particularly useful for studies in the upper atmosphere region of from 100–600 kilometers from the earth.

More particularly, it is an object to provide a drag free spacecraft enabling the orbiting of scientific instruments within the 100–600 kilometer range wherein the orbital path followed by the vehicle is substantially the same as would result in a satellite in which gravitational forces alone were involved, all to the end that the useful life of the craft is increased and more reliable data relating to various investigations can be attained.

Still another important object is to provide a spacecraft meeting the foregoing objects which is of a construction such that many different types of experiments may be carried out employing the same basic drag free control system to the end that great economy is achieved in conducting a series of experiments.

Briefly, these and many other objects and advantages of this invention are attained by providing an inner body surrounded by a concentric outer body including inner, intermediate, and outer modules.

The inner body is arranged to orbit without any physical engagement with the surrounding outer body. The inner module of the outer body incorporates sensing means for detecting any deviation of the position of the inner body from its initially established position when placed in orbit. These sensing means provide signals in response to such deviations to suitable propulsion units incorporated in the intermediate module and including engine arrangements extending to the exterior of the outer module, so that the outer body comprising the inner, intermediate, and outer modules moves as a unit by the propulsion means in such manner as to maintain the inner module concentric with the inner body.

By means of the foregoing arrangement, the outer body is "slaved" to the inner body and will thus follow the same orbit as the inner body. Since the inner body is protected from all major external drag forces by the surrounding outer bodies it is affected substantially only by gravity and will follow a true gravitational orbital path. The system results in a substantially drag free spacecraft and the various experiments outlined heretofore may be conducted by suitable instruments carried on the outer module.

An important feature of this invention resides in the modular characteristics of the intermediate and outer modules which enable the propulsion system and instruments to be varied to suit certain conditions and yet the same inner body and inner module with its associated sensing means to be employed. As a consequence, increased economy and increased reliability may be realized in conducting a series of experiments involving various different conditions and different instruments, the basic drag free control system being the same for all such experiments.

Figure 2:
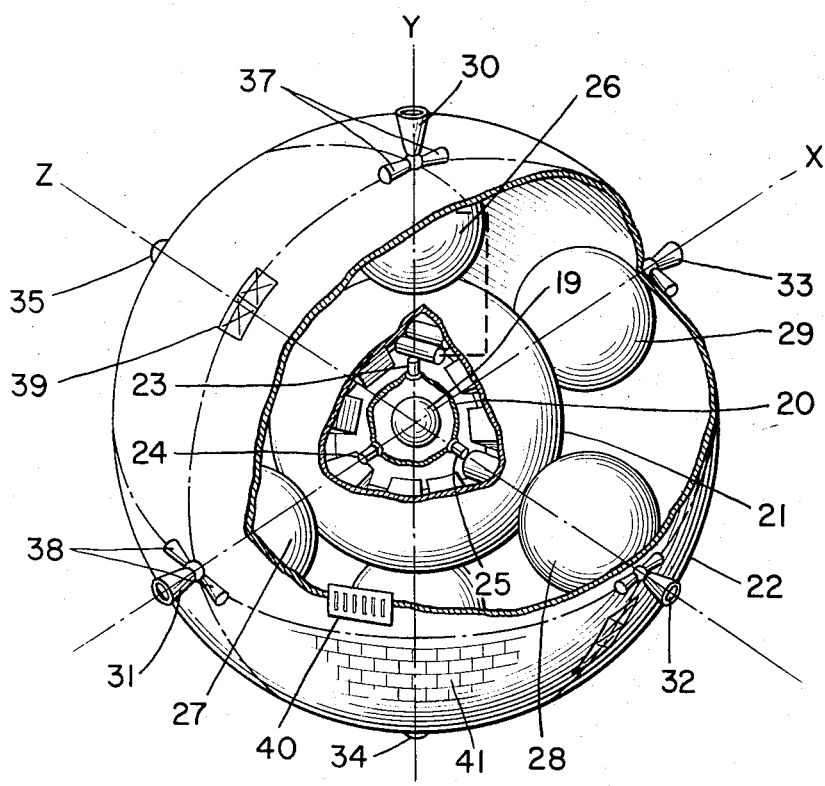

A better understanding of the invention will be had by now referring to the accompanying schematic drawings therof, in which:

FIGURE 1 is a fragmentary view of the earth showing a satellite in orbit useful in explaining the basic principles involved in providing a drag free spacecraft; and FIGURE 2 is a perspective cut-away view of the novel drag free spacecraft of this invention.

Referring first to FIGURE 1 there is shown an artificial satellite or spacecraft including an inner body or central mass 10 surrounded by an outer body 11. During launching of the satellite, the mass 10 is held in concentric relationship with respect to the outer body 11 as by a series of retractable spokes 12, 13, 14, and 15. After the satellite has been launched into an orbit, such as in the direction of the arrow 16 relative to the earth 17, the supporting spokes 12–15 are retracted to release the inner body or central mass by any suitable control means such as a radio signal so that the inner body 10 will be in free orbit within the outer body 11.

It will be clear from the foregoing that the inner body 10 is subject substantially only to the force of gravity. The outer body 11, on the other hand, is subject to both the force of gravity and drag forces indicated schematically by the arrows 18. As a consequence, the inner body 10 will have a tendency to move forward within the outer body 11 in the direction of the arrow 16 and thus eventually engage the forward inner side wall of the outer body.

On the other hand, if the outer body 11 could be provided with suitable propulsion means to overcome the drag forces 18 and retain it in a concentric relationship with the inner body 10, the entire satellite sytem would move as though it were subject substantially only to the force of gravity and thus follow a true gravitational orbit.

In accordance with the principles of a drag free satellite system, the outer body 11 incorporates a sensing means which senses a deviation of the initial position of the inner body 10 relative to the outer body 11. Any such deviation gives rise to a signal generated by the sensing means which, in turn, controls suitable propulsion nozzles to cause the outer body 11 to move in a direction so that a concentric relationship is maintained with respect to the inner body 10. The outer body 11 is thus "slaved" to the inner body 10 and the desired drag free satellite system results.

Referring now to FIGURE 2, there is illustrated a drag free spacecraft in accordance with the present invention. As shown there is provided an inner body 19 in the form of a central mass and an outer body made up of an inner module 20, an intermediate module 21, and an outer module 22. The inner module 20 incorporates sensing means, such as indicated at 23, 24, and 25, for detecting movements of the inner body 19 relative to three mutually perpendicular axes X, Y, and Z passing through the center of the system. The intermediate module 21 incorporates the propulsion system including fuel tanks 26, 27, 28, and 29 and associated engines 30, 31, 32, 33, 34, and 35, extending through the outer module 22 and positioned to direct thrust forces along the various axes X, Y, and Z.

The propulsion system is connected through suitable means to the sensing means to be responsive to the sensing means so as to provide a thrust in response to a signal from the sensing means. One such control linkage is indicated, by way of example, by the dashed line between the sensing means 23 and the propulsion system including the fuel tank 26 and engine 30. The direction of thrust is determined by the particular sensing means affected and the duration or magnitude of the signal provided by the sensing means, which, in turn, depends upon the magnitude of position deviation and motion of the inner body. Thus, the engines 30–35 can effect linear movements of the outer body comprised of the inner, intermediate, and outer modules as a unit relative to the inner body 19 to maintain the outer body centered with respect to the inner body.

The propulsion means also preferably include pairs of engines such as indicated at 37 and 38 for controlling the roll of the outer body with respect to an inertial reference system.

As illustrated in FIGURE 2, the engine systems are preferably located at the intersection of three mutually perpendicular great circles, the planes of which intersect at the origin of the three mutually perpendicular axes. The pairs of engines for controlling roll are directed along tangents to the great circles and are oriented such that diametrically opposite ones of given pairs of engines will provide a desired turning moment. These roll control engines may be operated from the earth through a suitable radio link or through a programmed computor aboard the craft to orient the craft so that its instruments will be properly directed. For example, the outer module 22 may carry an optical tracking reflector 39, antennae such as indicated at 40, solar cell panels such as indicated at 41, probe instruments for detecting temperature, radiation, and so forth.

In operation, the inner body 19 of the spacecraft illustrated in FIGURE 2 is initially held in a concentric relationship with respect to the inner module 20. Suitable retractable type spokes such as illustrated in FIGURE 1 may be employed for this purpose. When the craft is in a given orbit, the inner body 19 is set free so as to follow the orbit without any physical engagement with the inner module 20. The sensing means 23, 24, and 25 will detect any deviation in the position of the inner body 19 relative to the inner module and provide appropriate signals to the propulsion means incorporated in the intermediate module 21. The direction and magnitude of thrust provided by various ones of the engines will then move the outer body comprised of the inner, intermediate and outer modules in a direction to maintain the inner body 19 properly concentric relative to the inner module. As a consequence, the entire craft will move in an orbit determined substantially solely by the force of gravity. With such drag free spacecraft, the various desired measurements set forth heretofore may be readily carried out.

In the craft of FIGURE 2, it is preferable to make the inner body 19 and the inner module 20 incorporating the sensing means of a constant physical design so that a highly reliable detection system for providing propulsion control signals to the propulsion system can be realized. On the other hand, the intermediate module 21 incorporating the propulsion means, and outer module 22 incorporating various instruments may be interchanged with other modules depending upon the particular mission for which the spacecraft is designed. In other words, the same inner body and inner module may be employed with a number of different types of propulsion systems and instruments so that considerable economy can be realized when conducting a series of experiments.

While only one particular configuration for a drag free spacecraft has been shown and described, variations that fall clearly within the scope and spirit of this invention will occur to those skilled in the art. For example, the spacecraft may be used for interplanetary, interstellar, and intergalactic investigations in which the craft is subject to one or more gravitational fields. The invention, accordingly, is not to be thought of as limited to the one example set forth merely for illustrative purposes.

What is claimed is:

1. A drag free spacecraft comprising, in combination: an inner body; an outer body including: an inner module surrounding said inner body and free of any physical engagement therewith, an intermediate module connected to and surrounding said inner module, and an outer module incorporating instruments connected to and surrounding said intermediate module, said inner module incorporating sensing means for detecting the position of said inner body, said intermediate module incorporating propulsion means including engine means extending to the exterior of said outer module, said intermediate and outer modules being interchangeable with different intermediate and outer modules for use with said inner body and inner module, said propulsion means being responsive to said sensing means to move said outer body comprised of said inner, intermediate, and outer modules as a unit in a direction to maintain said inner body substantially centered within said inner module while said inner body is in free orbit with respect to an external celestial body, whereby drag forces experienced by said outer body are compensated and said spacecraft travels as a whole substantially in an orbit as though gravity were the only force acting on said craft.

2. A spacecraft according to claim 1, in which said propulsion means includes at least six engines disposed respectively at the intersection points of three mutually perpendicular great circles on said outer module for effecting transitional movements of said craft in the directions of three mutually perpendicular reference axes.

3. A spacecraft according to claim 2, in which said propulsion means further includes six pairs of roll control engines respectively disposed at said intersection points, each pair having its two nozzles disposed in opposite directions along a tangent to an intersecting great circle such as to enable a rotational moment to be applied to said outer body about any one of said three mutually perpendicular axes by operating appropriate diametrically oppositely disposed ones of said pairs of engines.

References Cited

UNITED STATES PATENTS

| | | | |
|---|---|---|---|
| 3,135,479 | 6/1964 | Badewitz | 244—1 |
| 3,233,848 | 2/1966 | Byrne | 244—14 |

FERGUS S. MIDDLETON, *Primary Examiner.*

MILTON BUCHLER, *Examiner.*

B. BELKIN, *Assistant Examiner.*